United States Patent [19]
Haines

[11] 3,844,629

[45] Oct. 29, 1974

[54] LINEAR MOTION BALL BEARINGS

[75] Inventor: Derrick John Haines, Felsted, near Dunmow, England

[73] Assignee: Ransome Hoffman Pollard Limited, Essex, England

[22] Filed: Aug. 9, 1973

[21] Appl. No.: 386,887

[30] Foreign Application Priority Data
Aug. 15, 1972   Great Britain................... 38054/72

[52] U.S. Cl............................................. 308/6 C
[51] Int. Cl. ......................................... F16c 29/06
[58] Field of Search................... 308/6 C, 6 R, 185; 64/23.7

[56] References Cited
UNITED STATES PATENTS

| | | | |
|---|---|---|---|
| 3,398,999 | 8/1968 | Halvorsen | 308/6 C |
| 3,512,849 | 5/1970 | Weisel | 308/6 C |
| 3,540,782 | 11/1970 | Worm | 308/6 C |
| 3,545,826 | 12/1970 | Magee et al. | 308/6 C |

FOREIGN PATENTS OR APPLICATIONS 1,575,068   1/1970   Germany............................. 308/6 C

*Primary Examiner*—Charles J. Myhre
*Assistant Examiner*—R. H. Lazarus
*Attorney, Agent, or Firm*—Brisebois & Kruger

[57] ABSTRACT

A linear motion ball bearing comprises a ball retainer of generally cylindrical sleeve form which is provided with a plurality of raceways. A plurality of balls substantially fills each raceways. The bearing also has a plurality of load-carrying plates. Each of the raceways has an axially extending portion over which the balls contained therein are, in use, under load and a portion over which the balls contained therein are, in use, load free. Each load-carrying plate is co-operable for load-bearing purposes with the balls under load of a pair of adjacent raceways.

9 Claims, 5 Drawing Figures

LINEAR MOTION BALL BEARINGS

This invention relates to a linear motion ball bearing.

According to the present invention a linear motion ball bearing comprises a ball retainer of generally cylindrical sleeve from which is provided with a plurality of raceways, a plurality of balls substantially filling each raceway, and a plurality of load-carrying plates, each of the raceways having an axially extending portion over which the balls contained therein are, in use, under load and a portion over which the balls contained therein are, in use, load free, in which each load-carrying plate is co-operable for load-bearing purposes with the balls under load of a pair of adjacent raceways.

In some cases it is preferable that the balls contained in the load-free portions of adjacent raceways interdigitate.

Advantageously, each of the load-carrying plates is made of steel and is of sufficient width to permit transverse flexing.

Each load-carrying plate may have a central thicker portion extending across part of its width and about which it is rockable.

Preferably, each load-carrying plate is provided with a respective groove for guiding the balls of each of its pair of raceways, each of said grooves being a "mirrorimage" of the co-operating portion of the corresponding raceway.

One form of linear motion ball bearing constructed in accordance with the invention will now be described, by way of example, with reference to the accompanying drawings, in which:-

Figure 1:
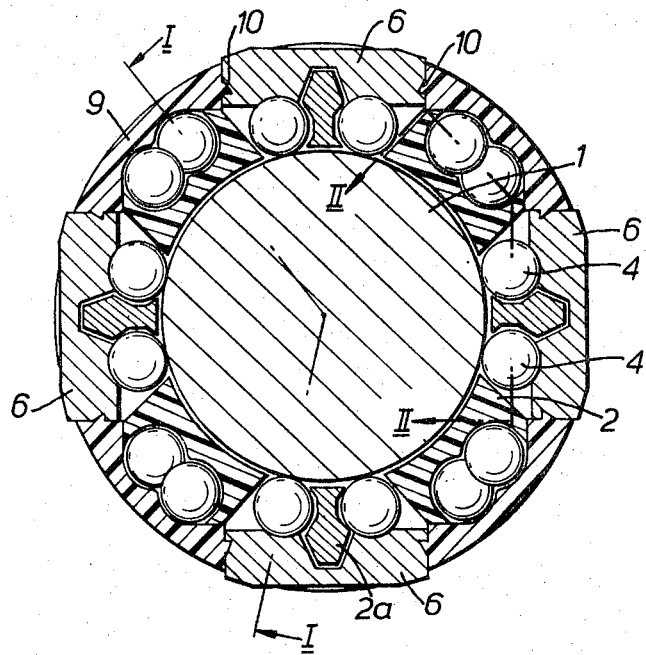
FIG. 1 is a transverse sectional view of a linear motion ball bearing constructed in accordance with the invention.
Figure 3:
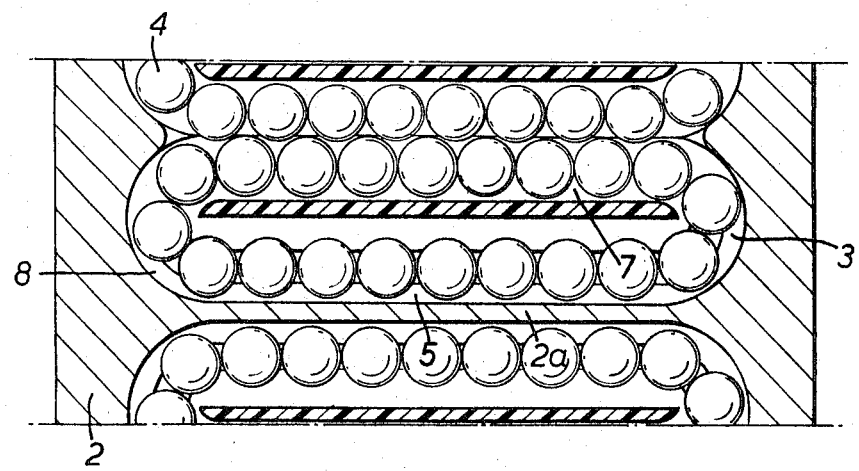
FIG. 3 is a section taken on the line II—II of FIG. 1.

Referring to the drawings, FIG. 1 illustrates a linear motion ball bearing having a central shaft 1 surrounded by a generally cylindrical sleeve ball retainer 2 which is moulded in one-piece from a synthetic plastics material by a method described below with reference to FIG. 4. The ball retainer 2 is provided with eight raceways 3 of generally oval shape (see FIG. 3). Each raceway 3 is substantially filled with a plurality of balls 4 and each raceway has a first, load-bearing portion 5, in which the balls 4 are in direct contact with both the shaft 1 and one of four load-carrying plates 6 made of steel, and a further straight portion 7, in which the balls 4 are out of contact with both the shaft 1 and any of the load-carrying plates 6. The straight portions 5 and 7 of each raceway 3 are connected by a pair of curved portions 8, which permit circulation of the balls 4 on relative movement between the shaft 1 and the bearing.

Figure 2:
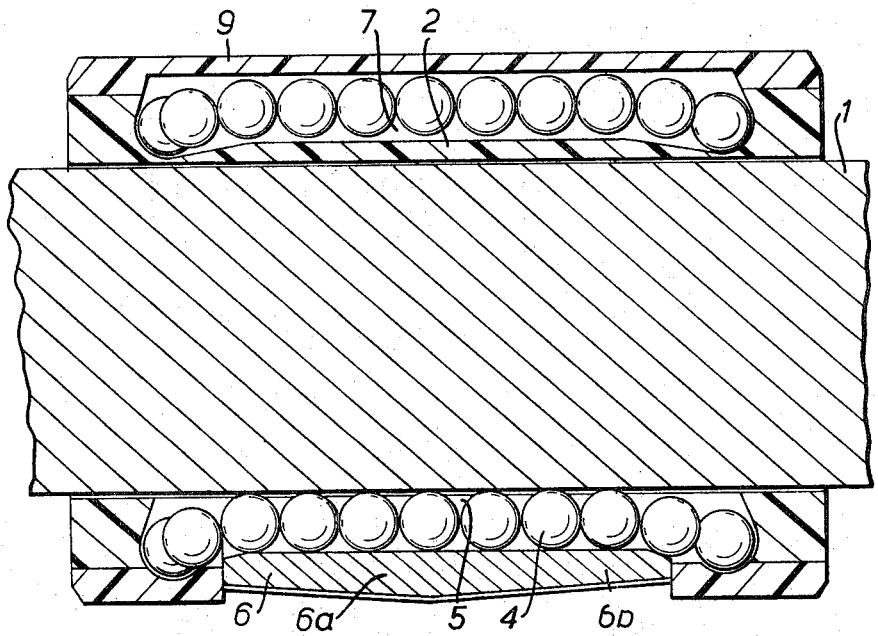
FIG. 2 is a section on the lines I—I of FIG. 1.
Figure 5:
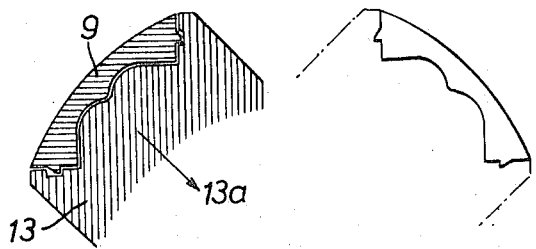
FIG. 5 is a view similar to FIG. 4 showing how the outer shell of the bearing is moulded.
Figure 5:
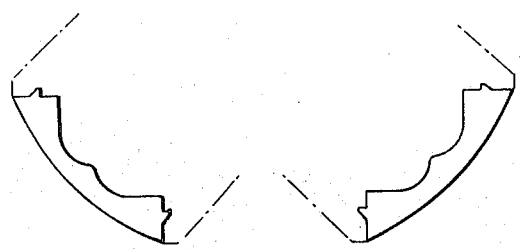

An outer sleeve 9, which is moulded in one-piece from a synthetic plastics material by a method described below with reference to FIG. 5 retains the balls 4 against the portions 7 and 8 of the raceways 3 and the plates 6 against the balls 4 which occupy the portions 5 of the raceways 3, the plates 6 being keyed as at 10 to the sleeve 9. The outer sleeve 9 and the ball retainer 2 are held against relative axial movement by means of the plates 6 the ends of which provide the necessary axial location, though slight radial movement of the plates 6 is possible. The outer periphery of each of the plates 6 is formed with a central portion 6a which is thicker than its end portions 6b (see FIG. 2). The portion 6a of each plate 6 forms a fulcrum about which the plate 6 can rock. This rocking movement of the plates 6 permits self-alignment of the load-carrying balls with respect to the shaft. Each of the plates 6 is provided with a respective groove 11 for guiding the balls 4 of each of the corresponding two raceways 3. Each of the grooves 11 is a mirror-image of the cooperating portion 5 of the corresponding raceway 3. The entire bearing is enclosed within a cylindrical sleeve (not shown) of hard metal such as steel and is held therein by press fitted or swaged end rings (not shown) or by any other suitable means.

As can be seen from FIG. 1 each load-carrying plate 6 co-operates with the load-bearing portions 5 of a pair of adjacent raceways 3, the balls 4 of the two raceways being separated in their loaded condition by a separator 2a forming part of the moulded ball retainer 2. As can be seen from FIG. 3 the portions 7 of a pair of adjacent raceways 3 are so formed that the balls 4 of each raceway interdigitate. This interdigitation helps to prevent misalignment and bunching of the balls in their load-free condition which would tend to cause jamming of the bearing. This arrangement naturally results in the balls 4 of adjacent raceways 3 circulating in opposite directions.

Figure 4:
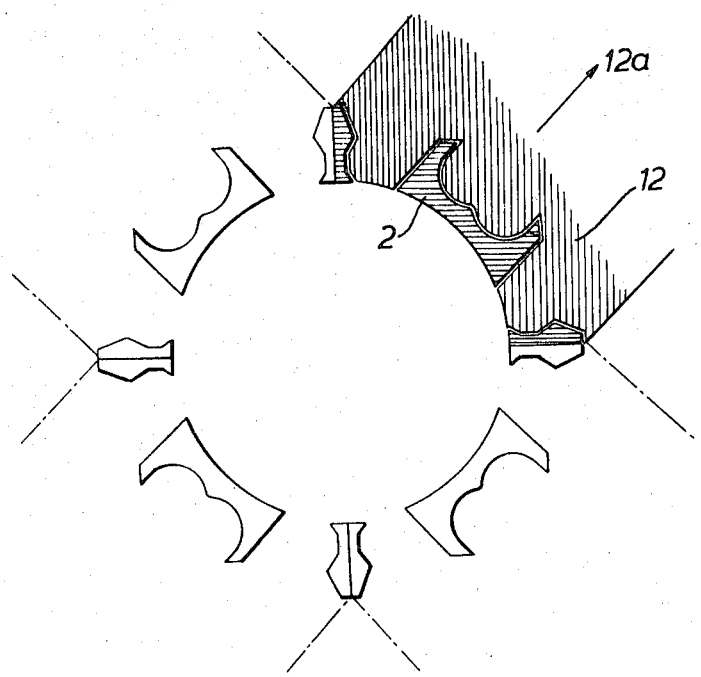
FIG. 4 is a diagrammatic view showing how the ball retainer of the bearing is moulded.

FIG. 4 shows diagrammatically how the ball retainer 2 is moulded using four plungers 12 (only one of which is shown - the positions of the other three being denoted by dotted lines). The part of the retainer 2 which is shaped by the plunger 12 that is shown is hatched and it is apparent from FIG. 4 that only four plungers are required to form the ball retainer 2 having eight raceways 3. Similarly, FIG. 5 shows diagrammatically how the outer sleeve 9 can be moulded using only four plungers 13 (only one of which is shown - the positions of the other three being denoted by dotted lines). In each case an arrow 12a 13a respectively indicates the direction in which the plungers 12, 13 must be moved after the moulding is completed.

If the above described bearing is compared with known linear motion bearings, in which each circuit of balls operates independently and each circuit of balls has its own load-carrying plate, it will be apparent that it has a number of advantages. Firstly, there is an increase in the number of circuits which can be built into the bushing, a decrease in the number of load-carrying plates and an increase in the load bearing capacity of the bearing.

Also, the width of the load-carrying plates 6 (which is necessary to cover the load-bearing portions of two adjacent raceways 3) is sufficiently large to permit transverse flexing. This results in the plates 6 having some shock-absorbing capability. Furthermore, both the ball retainer 2 and the outer sleeve 9 are easier to mould than their counterparts in the conventional bearing as one plunger only is required for each pair of circuits instead of one plunger for each circuit in the conventional bearing.

I claim:

1. A linear ball bearing for axial movement along a round shaft, said bearing comprising a cylindrical sleeve ball retainer provided with a plurality of raceways, a plurality of balls substantially filling each raceway and a plurality of load-carrying plates supported by said ball retainer, each of said raceways extending transversely substantially tangentially with respect to said shaft, each of said raceways having an axially extending load bearing portion and an axially extending load free portion interconnected at each axial end by a respective curved portion, said balls being in contact with said shaft and a respective one of said load-carrying plates when in said load bearing portions and being out of contact with both said shaft and any of said load-carrying plates when in said load free portions, wherein each of said load-carrying plates contacts said balls in said load bearing portions of a pair of adjacent raceways.

2. A linear ball bearing according to claim 1, wherein said balls in said load free portions of each pair of adjacent raceways interdigitate.

3. A linear ball bearing according to claim 1, wherein each of said load-carrying plates is made of steel.

4. A linear ball bearing according to claim 1, wherein each of said load-carrying plates has a transversely extending central portion of increased thickness.

5. A linear ball bearing according to claim 1, wherein each of said load-carrying plates is provided with a respective groove for guiding the balls of each of its pair of raceways.

6. A linear ball bearing according to claim 1, wherein said ball retainer is provided with eight raceways, said bearing having four load-carrying plates.

7. A linear ball bearing for axial movement along a round shaft, said bearing comprising a cylindrical sleeve ball retainer provided with a plurality of raceways, a plurality of balls substantially filling each raceway and a plurality of load-carrying steel plates supported by said ball retainer, each of said raceways having an axially extending load bearing portion and an axially extending load free portion interconnected at each axial end by a respective curved portion, said balls in said load free portions of each pair of adjacent raceways interdigitating and each of said load-carrying plates being aligned with load bearing portions of a pair of adjacent raceways.

8. A linear ball bearing according to claim 7, wherein each of said load-carrying plates has a transversely extending central portion of increased thickness.

9. A linear ball bearing for axial movement along a round shaft, said bearing comprising a cylindrical sleeve ball retainer provided with eight raceways, a plurality of balls substantially filling each raceway and four loadcarrying steel plates supported by said ball retainer, each of said raceways having an axially extending load bearing portion and an axially extending load free portion interconnected at each axial end by a respective curved portion, said balls in said load free portions of each pair of adjacent raceways interdigitating and each of said loadcarrying plates being:
   a. aligned with said ball bearing portions of a pair of adjacent raceways;
   b. provided with a respective groove for guiding the balls of each of its pair of raceways; and
   c. provided with a transversely extending central portion of increased thickness.

* * * * *